United States Patent
Maruyama

(10) Patent No.: US 8,521,405 B2
(45) Date of Patent: Aug. 27, 2013

(54) AIR-FUEL RATIO DIAGNOSTIC DEVICE FOR INTERNAL COMBUSTION ENGINE

(75) Inventor: Kenya Maruyama, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 146 days.

(21) Appl. No.: 13/189,664

(22) Filed: Jul. 25, 2011

(65) Prior Publication Data

US 2012/0029790 A1    Feb. 2, 2012

(30) Foreign Application Priority Data

Jul. 28, 2010   (JP) .................................. 2010-169800

(51) Int. Cl.
*F02D 11/00*    (2006.01)
*F02D 11/02*    (2006.01)

(52) U.S. Cl.
USPC ............................ 701/109; 123/690; 123/695

(58) Field of Classification Search
USPC ................. 701/103, 109, 114; 123/672, 688, 123/690, 692, 693, 694, 695, 703, 198 D; 73/23.32, 114.72, 114.73
See application file for complete search history.

(56) References Cited

U.S. PATENT DOCUMENTS 5,542,404 A * 8/1996 Hasegawa et al. ............ 123/690
2009/0211350 A1* 8/2009 Iwazaki et al. ............ 73/114.72

FOREIGN PATENT DOCUMENTS

JP    2003138962 A    5/2003
JP    2008309065 A    12/2008

* cited by examiner

*Primary Examiner* — Mahmoud Gimie

(74) *Attorney, Agent, or Firm* — Gifford, Krass, Sprinkle, Anderson & Citkowski, P.C.

(57) ABSTRACT

An air-fuel ratio diagnostic device for an internal combustion engine. The device includes an air-fuel ratio that detects oxygen concentration in the exhaust. A determination unit determines a variation in air-fuel ratio between engine cylinders based on a detection value of the air-fuel ratio sensor. A change amount in the detection value for a certain time when the detection value is changing from a lean side peak value toward a rich side peak value is defined as a rich change rate. A change amount in the detection for a certain time when the detection value is changing from a rich side peak value toward a lean side peak value is defined as a lean change rate. The determination unit determines a degree of variation between the cylinders based on the rich and lean change rates.

15 Claims, 6 Drawing Sheets

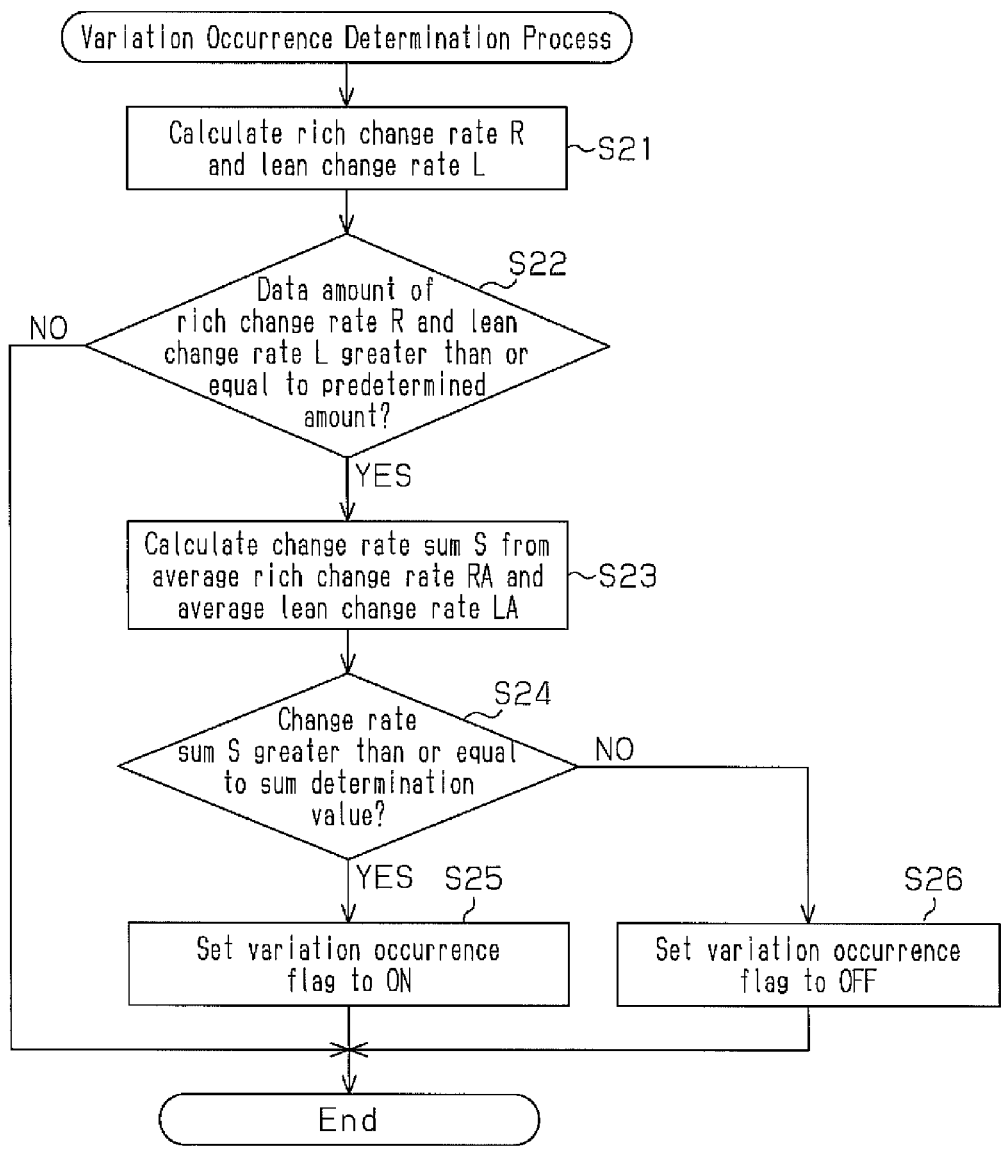

AIR-FUEL RATIO DIAGNOSTIC DEVICE FOR INTERNAL COMBUSTION ENGINE

CROSS-REFERENCE TO RELATED APPLICATION(S)

This application claims priority of Japanese Patent Application No. 2010-169800, filed Jul. 28, 2010.

BACKGROUND OF THE INVENTION

The present invention relates to an air-fuel ratio diagnostic device for an internal combustion engine that includes an air-fuel ratio sensor, which detects oxygen concentration in exhaust at a junction of an exhaust manifold where the exhaust flowing from a plurality of cylinders meet, and determines variation between the cylinders based on the detection of the air-fuel ratio sensor.

Japanese Patent Application Laid-Open No. 2003-138962 describes an example of the above-described air-fuel ratio diagnostic device for an internal combustion engine. Based on detection data from an air-fuel ratio sensor, the air-fuel ratio diagnostic device calculates a variation amount, which is the difference between the two peak values in the detection data from the air-fuel ratio sensor, to determine whether there is a variation between cylinders.

However, in the structure that determines a variation between cylinders based on only the variation amount of the air-fuel ratio, for example, when a target air-fuel ratio AFX1 is altered to a leaner target air-fuel ratio AFX2, the problem described below may occur.

When the air-fuel ratio changes toward the target air-fuel ratio AFX2 due to the alteration of the target air-fuel ratio, the variation amount, which is calculated from the difference between the two peaks, may exceed a determination value even when there is actually no variation between cylinders. In this case, based on the variation amount that has exceeded the determination value, a determination is made that variation is occurring between cylinders. Thus, the determination does not accurately reflect the actual air-fuel ratio.

In this manner, in the example of the air-fuel ratio diagnostic device disclosed in Japanese Patent Application Laid-Open No. 2003-138962, a problem may occur when determining variations between cylinders. Such a problem may also occur for determinations related to variations between cylinders, such as when determining the degree of variation between cylinders and when determining whether the variation between cylinders is resulting in a leaner or richer air-fuel ratio.

SUMMARY OF THE INVENTION

Accordingly, it is an object of the invention to provide an air-fuel ratio diagnostic device for an internal combustion engine that improves the accuracy of determinations related to variations between cylinders.

A principle of the present invention will now be described.

When there is a significant variation between cylinders, the difference between the peak values on the lean and rich sides detected by an air-fuel ratio sensor increases, resulting in increases in the absolute value of a rich change rate and the absolute value of a lean change rate. When a variation is occurring between cylinders, the rich change rate and the lean change rate differ from each other in terms of absolute value.

Specifically, when a rich variation occurs in which the air-fuel ratio of a specific cylinder significantly deviates to the rich side from the air-fuel ratios of the other cylinders, as exhaust including a high proportion of exhaust from the specific cylinder passes through the junction of an exhaust manifold, the detection of the air-fuel ratio sensor changes to the rich side. Then, when the proportion of the exhaust from the other cylinders becomes greater than the proportion of the exhaust from the specific cylinder at the junction of the exhaust manifold, the detection of the air-fuel ratio sensor changes to the lean side. In this state, the detection of the air-fuel ratio sensor includes a rich peak value, and the peak value increases as the variation between cylinders increases. In addition, the air-fuel ratio gradually changes as compared to when the detection of the air-fuel ratio sensor is changed to the rich side by the exhaust from the specific cylinder.

Further, when a lean variation occurs in which the air-fuel ratio of a specific cylinder significantly deviates to the lean side from the air-fuel ratios of the other cylinders, as exhaust including a high proportion of exhaust from the specific cylinder passes through the junction of an exhaust manifold, the detection of the air-fuel ratio sensor changes to the lean side. Then, when the proportion of the exhaust from the other cylinders becomes greater than the proportion of the exhaust from the specific cylinder at the junction of the exhaust manifold, the detection of the air-fuel ratio sensor changes to the lean side. In this state, the detection of the air-fuel ratio sensor includes a lean peak value, and the peak value increases as the variation between cylinders increases. In addition, the air-fuel ratio gradually changes as compared to when the detection of the air-fuel ratio sensor is changed to the lean side by the exhaust from the specific cylinder.

When lean variation occurs in which the deviation of the air-fuel ratio of a specific cylinder to the lean side is greater than that of the air-fuel ratios of the other cylinders, the absolute value of a lean change rate is greater than that of a rich change rate. When rich variation occurs in which the deviation of the air-fuel ratio of a specific cylinder to the rich side is greater than that of the air-fuel ratios of the other cylinders, the absolute value of a rich change rate is greater than that of a lean change rate. Further, as the variation between cylinders increases, the lean change rate and the rich change rate both increase.

In this manner, a rich change rate and lean change rate, which are based on the detection of the air-fuel ratio sensor, reflect the degree of variation between cylinders. Thus, a change rate computation value calculated based on each change rate also reflects the degree of variation between cylinders. A state of a variation between cylinders may refer to any one of whether a variation occurring between cylinders, a magnitude of the variation between cylinders, and the variation between cylinders being lean or rich.

Accordingly, the present invention determines the variation between cylinders based on a rich change rate and a lean change rate and thereby obtains an accurate determination of variation between cylinders.

One aspect of the present invention provides an air-fuel ratio diagnostic device for an internal combustion engine that includes an exhaust manifold provided with a junction in which exhaust discharged from a plurality of cylinders meet. The device includes an air-fuel ratio sensor that detects oxygen concentration in the exhaust at the junction. A determination unit performs a determination related with a variation between the cylinders, which includes a variation in air-fuel ratio between the cylinders, based on a detection value of the air-fuel ratio sensor. A change amount in the detection value for a certain time when the detection value is changing from a peak value at the lean side toward a peak value at the rich side is defined as a rich change rate. A change amount in the detection value for a certain time when the detection value is changing from a peak value at the rich side toward a peak value at the lean side is defined as a lean change rate. The determination unit determines a degree of variation between the cylinders based on the rich change rate and the lean change rate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a flowchart illustrating the procedure for a variation occurrence determination process according to a second embodiment of the present invention performed by the electronic controller of FIG. 1.

DETAILED DESCRIPTION OF THE INVENTION

First Embodiment

A first embodiment of the present invention will now be described with reference to FIGS. 1 to 5B. The present embodiment is embodied in an air-fuel ratio diagnostic device for an in-line four-cylinder type spark ignition internal combustion engine.

Figure 1:
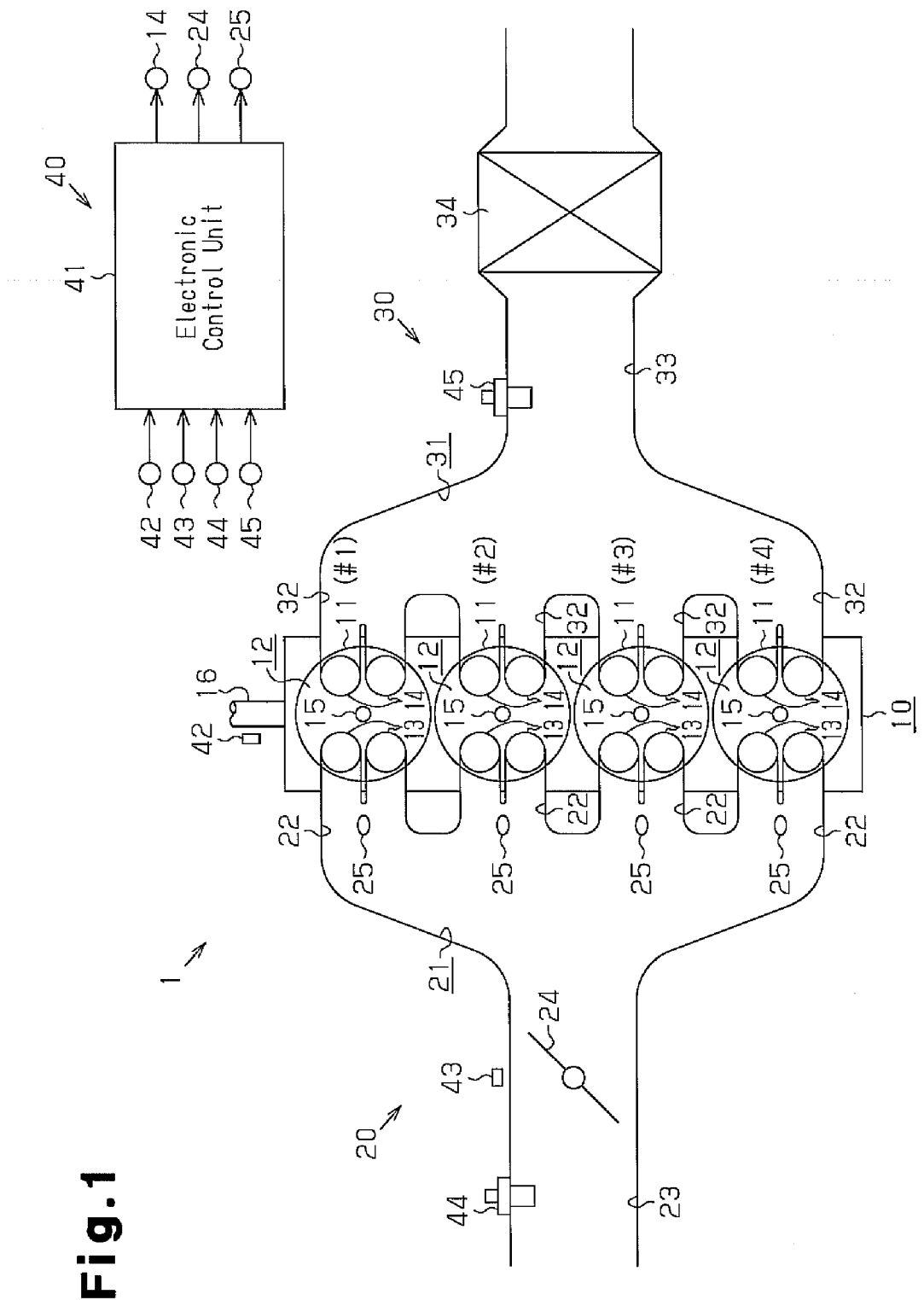
FIG. 1 is a schematic diagram showing the structure of an internal combustion engine according to a first embodiment of the present invention.

As shown in FIG. 1, the internal combustion engine 1 includes an engine main body 10, which burns an air-fuel mixture, an intake device 20, which supplies air and fuel to combustion chambers 12 in the engine main body 10, an exhaust device 30, which discharges the burned gas from the combustion chambers 12, and a controller 40, which centrally controls various devices including the above devices.

The intake device 20 includes an intake manifold 21, which is connected to the combustion chambers 12, a throttle valve 24, which is arranged in the intake manifold 21 to adjust the area of the flow path through which the drawn in air flows, and injectors 25, which inject fuel into the intake manifold 21. The intake manifold 21 includes a junction 23, which includes the throttle valve 24 and serves as an inlet for the intake manifold 21, four branches 22, which are connected to the downstream side of the junction 23 and extend to the corresponding four cylinders 11. Each branch 22 includes an injector 25, which injects fuel into the corresponding cylinder 11.

The exhaust device 30 includes an exhaust manifold 31, which is connected to the combustion chambers 12, and a three-way catalytic device 34, which is arranged in the exhaust manifold 31 to purify the exhaust. The exhaust manifold 31 includes a junction 33, which includes the three-way catalytic device 34 and serves as an outlet for the exhaust manifold 31, and four branches 32, which are connected to the upstream side of the junction 33 and extending to the corresponding four cylinders 11.

The engine main body 10 includes a crankshaft 16, which converts the reciprocating motion of pistons into a rotating motion, intake valves 13, which open and close ports of the combustion chambers 12 connected to the intake manifold 21, and exhaust valves 14, which open and close ports of the combustion chambers 12 connected to the exhaust manifold 31, and ignition plugs 15, which ignite the air-fuel mixture.

The controller 40 includes an electronic control unit 41, which performs various computations to control the internal combustion engine 1, and various sensors, such as a crank position sensor 42, a throttle position sensor 43, an air flow meter 44, and an air-fuel ratio sensor 45.

The crank position sensor 42 sends a signal corresponding to a rotation angle of the crankshaft 16 (hereinafter referred to as "crank angle CA") to the electronic control unit 41. The throttle position sensor 43 sends a signal corresponding to the open amount of the throttle valve 24 (hereinafter referred to as the throttle opening VA) to the electronic control unit 41. The air flow meter 44 is located at the upstream side of the throttle valve 24 in the intake manifold 21 and provides a signal corresponding to the intake air amount (hereinafter referred to as the intake air amount GA) to the electronic control unit 41. The air-fuel ratio sensor 45 is located at the upstream side of the three-way catalytic device 34 in the junction 33 of the exhaust manifold 31 and provides a signal corresponding to the oxygen concentration of the exhaust passing through the junction 33 to the electronic control unit 41. The signals from the air-fuel ratio sensor 45 and oxygen concentration have a linear relationship.

The electronic control unit 41 calculates parameters used for various controls. More specifically, based on a signal from the crank position sensor 42, the electronic control unit 41 calculates a computation value corresponding to the crank angle CA. Additionally, based on the computation value of the crank angle CA, the control unit 41 calculates a computation value corresponding to the rotational speed of the crankshaft 16 (hereinafter referred to as the engine speed NE). Based on a signal from the throttle position sensor 43, the control unit 41 calculates a computation value corresponding to the throttle opening VA. In addition, based on a signal from the air flow meter 44, the control unit 41 calculates a computation value corresponding to the intake air amount GA. Also, based on a signal from the air-fuel ratio sensor 45, the control unit 41 calculates a computation value corresponding to the air-fuel ratio (hereinafter referred to as the air-fuel ratio AF). Further, based on the intake air amount GA and engine load, the device computes a command value for the amount of fuel injected from each injector 25 (hereinafter referred to as the fuel injection amount QF).

The electronic control unit 41 executes air-fuel ratio control when the internal combustion engine 1 is running and variation determination control, which determines the degree of variation in the air-fuel ratio AF between the cylinders (hereinafter referred to as the variation ratio IR) when a variation occurs between the cylinders in addition to determining the specific cylinder causing the variation between the cylinders. Variation between cylinders indicates that the air-fuel ratio is abnormal. That is, the fuel-air ratio AF of a specific cylinder is greatly deviated to the rich side or lean side as compared with the air-fuel ratios of the other cylinders.

In the air-fuel ratio control, in order for the air-fuel ratio AF of each cylinder 11 to approach a target air-fuel ratio (hereinafter referred to as the target air-fuel ratio AFX), a feedback correction amount for the fuel injection amount QF is set based on the difference between the target air-fuel ratio AFX and the computation value of the air-fuel ratio AF, which is calculated from the detection value of the air-fuel ratio sensor 45.

Figure 2:
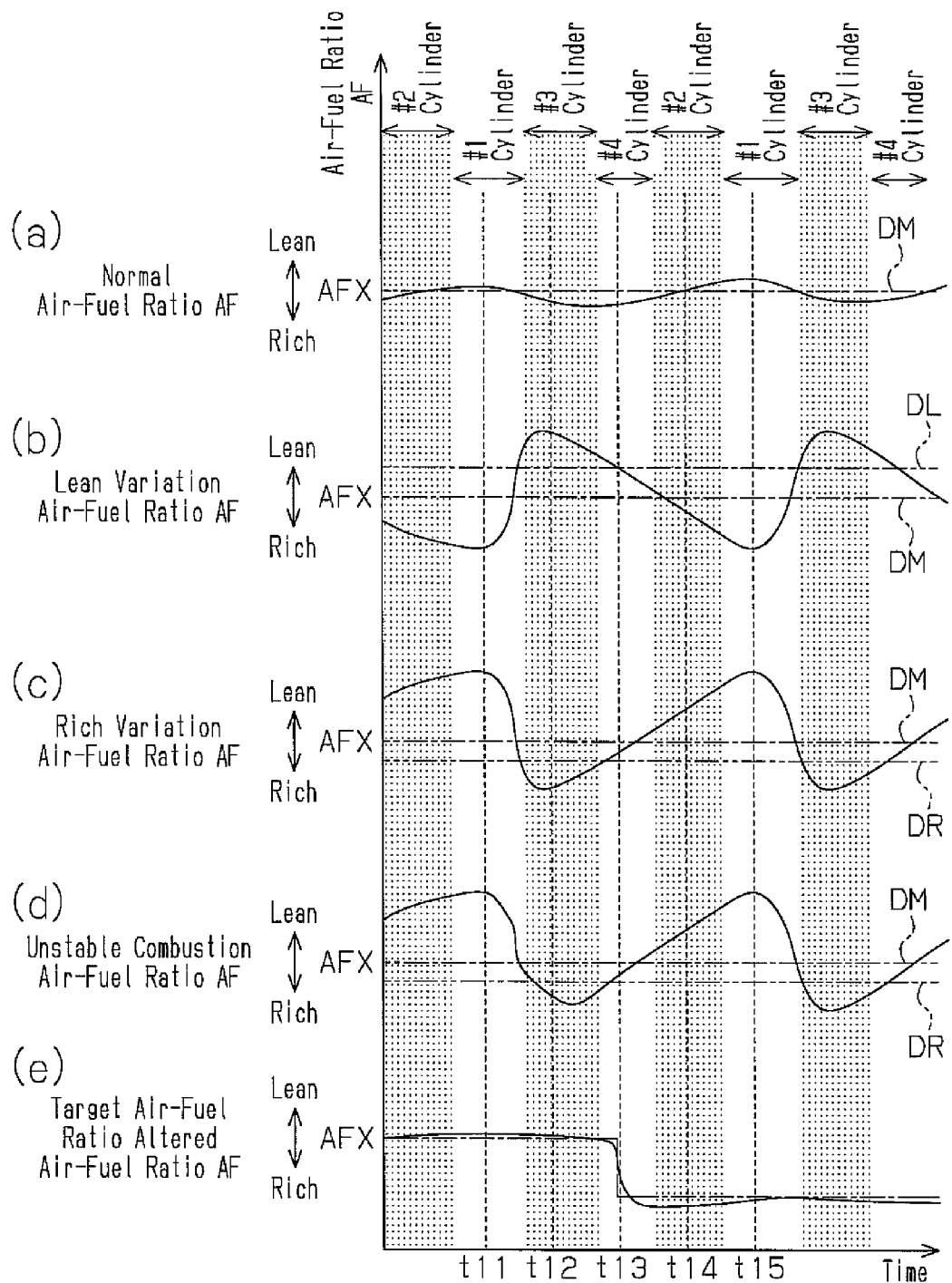
FIG. 2 is a timing chart showing an example of a change in the air-fuel ratio in the internal combustion engine of FIG. 1.

Referring to FIG. 2, variation between cylinders and a change in the air-fuel ratio AF will now be described. The single-dashed lines DM in FIG. 2 indicate the target air-fuel ratios AFX and the average value of the air-fuel ratios AF. In the description hereafter, the cylinders 11 are referred to as cylinder #1, cylinder #2, cylinder #3, and cylinder #4. Ignition is carried out in the order of cylinder #1, #3, #4, and #2.

A deposit on the injector 25 corresponding to a specific cylinder may decrease the fuel injection amount QF corresponding to the specific cylinder. In such a case, the air-fuel ratio AF of the cylinder may significantly deviate from the target air-fuel ratio AFX to the lean side. In the description hereafter, such a significant deviation in the air-fuel ratio AF of a specific cylinder toward the lean side as compared with the air-fuel ratios AF of the other cylinders will be referred to as lean variation.

Further, when the fuel injection amount QF for a specific cylinder increases due to abnormal opening of the corresponding injector 25, the air-fuel ratio AF of the cylinder greatly deviates from the target air-fuel ratio AFX to the rich side. In the description hereafter, such a significant deviation in the air-fuel ratio AF of a specific cylinder toward the rich side as compared with the air-fuel ratios AF of the other cylinders will be referred to as rich variation.

Changes in the air-fuel ratio AF in each operating state of the engine will now be described referring to items (a) to (c) in FIG. 2. Items (a) to (c) are examples of changes in air-fuel ratio AF when the target air-fuel ratio AFX is not altered.

Item (a) in FIG. 2 shows an example of a change in air-fuel ratio AF when there is no variation between cylinders. When there is no variation between cylinders, the air-fuel ratio AF fluctuates around the target air-fuel ratio AFX, and deviation from the target air-fuel ratio AFX is kept small.

Item (b) in FIG. 2 shows an example of a change in the air-fuel ratio AF when lean variation is occurring, and the air fuel ratio AF of cylinder #1 greatly deviates to the lean side as compared with the air-fuel ratios AF of the cylinders #2 to #4.

In the internal combustion engine 1 when undergoing air-fuel ratio control, the average value of the air-fuel ratio AF when lean variation is occurring is substantially equal to the value of the target air-fuel ratio AFX, as shown by the single-dashed line DM in FIG. 2. In contrast, in a hypothetical internal combustion engine that does not undergo air-fuel ratio control, the average value of the air-fuel ratio AF when lean variation is occurring is maintained at a value deviating to the lean side from the target air-fuel ratio AFX, as shown by the double-dashed line DL in FIG. 2.

Specifically, the air-fuel ratio AF changes in the internal combustion engine 1 as described below.

At time t11, that is, when a predetermined time has elapsed from when the exhaust stroke starts in cylinder #1, exhaust including a high proportion of the exhaust from cylinder #1 passes by the air-fuel ratio sensor 45 in the junction 33. Here, the air-fuel ratio sensor 45, which has been detecting exhaust having a rich air-fuel ratio, starts to detect exhaust having an oxygen concentration significantly deviating the air-fuel ratio to the lean side. Thus, the air-fuel ratio AF suddenly changes toward the lean side.

At time t12, that is, when a predetermined time has elapsed from when the exhaust stroke starts in cylinder #4, exhaust including a high proportion of the exhaust from cylinder #3, that is, exhaust including a smaller proportion of the exhaust from cylinder #1 compared to that in the period from time t11 to t12, passes by the air-fuel ratio sensor 45 in the junction 33. Here, the air-fuel ratio sensor 45 detects the oxygen concentration of exhaust, which includes a large amount of the exhaust from cylinder #3 that has undergone rich correction through the feedback correction of the air-fuel ratio control. Thus, the direction of variation of the air-fuel ratio AF changes from the lean side toward the rich side. Further, the air-fuel ratio AF changes more gradually compared to the period from time t11 to t12.

At time t13, that is, when a predetermined time has elapsed from when the exhaust stroke starts in cylinder #4, exhaust including a high proportion of the exhaust from cylinder #4 passes by the air-fuel ratio sensor 45 in the junction 33. Here, the air-fuel ratio sensor 45 detects the oxygen concentration of exhaust, which includes a large amount of the exhaust from cylinder #4 that has undergone rich correction through the feedback correction of the air-fuel ratio control. Thus, the air-fuel ratio AF continues to change toward the rich side.

At time t14, that is, when a predetermined time has elapsed from when the exhaust stroke starts in cylinder #2, exhaust including a high proportion of the exhaust from cylinder #2 passes by the air-fuel ratio sensor 45 in the junction 33. Here, the air-fuel ratio sensor 45 detects the oxygen concentration of exhaust, which includes a large amount of the exhaust from cylinder #2 that has undergone rich correction through the feedback correction of the air-fuel ratio control. Thus, the air-fuel ratio AF continues to change toward the rich side.

At time t15, that is, when the crankshaft 16 has been rotated in correspondence to a single combustion cycle of the internal combustion engine 1 (i.e., 720 degrees in crank angle) from time t11, which is used as a reference, exhaust including a high proportion of the exhaust from cylinder #1 passes again by the air-fuel ratio sensor 45 in the junction 33. Thus, the air-fuel ratio AF suddenly changes toward the lean side in the same manner as in time t11.

Subsequently, as long as lean variation continues, the changing cycle of the air-fuel ratio AF is repeated, in which each cycle includes the changes occurring in the air-fuel ratio AF from time t11 to t15.

Item (c) in FIG. 2 shows an example of changes in the air-fuel ratio AF when a rich variation is occurring due to the air-fuel ratio AF of cylinder #1 greatly deviating toward the rich side as compared to the air-fuel ratios AF of cylinders #2 to #4.

In the internal combustion engine 1 that undergoes air-fuel ratio control, the average value of the air-fuel ratio AF when rich variation is adjusted to be substantially equal to the value of the target air-fuel ratio AFX, as indicated by the single-dashed line DM in FIG. 2. In contrast, in a hypothetical internal combustion engine that does not undergo air-fuel ratio control, the average value of the air-fuel ratio AF when rich variation is occurring is maintained at a value deviating to the rich side from the target air-fuel ratio AFX, as indicated by the double-dashed line DR in FIG. 2.

Specifically, the air-fuel ratio AF changes in the internal combustion engine 1 as described below.

At time t11, that is, when a predetermined time has elapsed from when the exhaust stroke starts in cylinder #1, exhaust including a high proportion of the exhaust from cylinder #1 passes by the air-fuel ratio sensor 45 in the junction 33. Here, compared to the exhaust with the lean air-fuel ratio that has been detected by the air-fuel ratio sensor 45, the air-fuel ratio sensor 45 detects the oxygen concentration of exhaust and the air-fuel ratio greatly deviates to the rich side. As a result, the air-fuel ratio AF suddenly changes toward the rich side.

At time t12, that is, when a predetermined time has elapsed from when the exhaust stroke starts in cylinder #3, exhaust including a high proportion of the exhaust from cylinder #3, that is, exhaust including a smaller proportion of exhaust from cylinder #1 compared to that in the period from time t11 to t12 passes by the air-fuel ratio sensor 45 in the junction 33. Here, the air-fuel ratio sensor 45 detects the oxygen concentration of exhaust, which includes a large amount of the exhaust from cylinder #3 that has undergone lean correction through feedback correction in air-fuel ratio control. As a result, the direction of variation of the air-fuel ratio AF changes from the rich side toward the lean side. In addition, the air-fuel ratio AF changes more gradually than the period from time t11 to t12.

At time t13, that is, when a predetermined time has elapsed from when the exhaust stroke starts in cylinder #4, exhaust including a high proportion of the exhaust from cylinder #4 passes by the air-fuel ratio sensor 45 in the junction 33. Here, the air-fuel ratio sensor 45 detects the oxygen concentration of exhaust, which includes a large amount of the exhaust from cylinder #4 that has undergone lean correction through feedback correction in air-fuel ratio control. Thus, the air-fuel ratio AF continues to change toward the lean side.

At time t14, that is, when a predetermined time has elapsed from when the exhaust stroke starts in cylinder #2, exhaust including a high proportion of the exhaust from cylinder #2 passes by the air-fuel ratio sensor 45 in the junction 33. Here, the air-fuel ratio sensor 45 detects the oxygen concentration of exhaust, which includes a large amount of the exhaust from cylinder #2 that has undergone lean correction through feedback correction in air-fuel ratio control. Thus, the air-fuel ratio AF continues to change toward the lean side.

At time t15, that is, when the crankshaft 16 has been rotated in correspondence to a single combustion cycle of the internal combustion engine 1 (i.e., 720 degrees in crank angle) from time t11, which is used as a reference, exhaust including a high proportion of the exhaust from cylinder #1 passes again by the air-fuel ratio sensor 45 in the junction 33. Thus, the air-fuel ratio AF suddenly changes toward the rich side in the same manner as time t11.

Subsequently, as long as rich variation continues to occur, the changing cycle of the air-fuel ratio AF is repeated, in which each cycle includes the changes occurring in the air-fuel ratio AF from time t11 to t15.

Figure 3A:
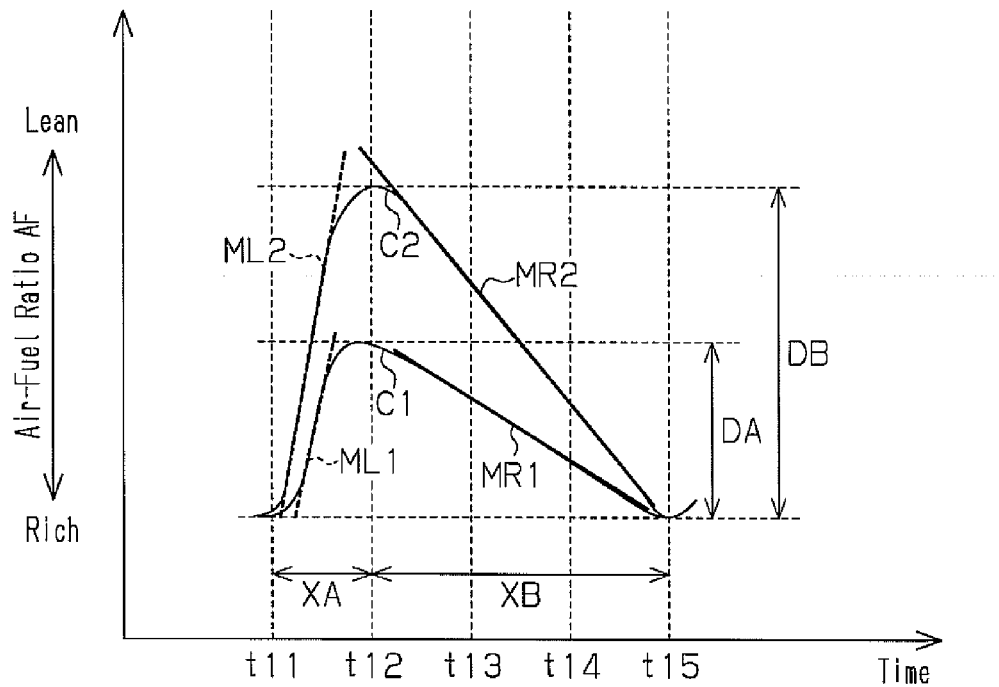
FIGS. 3A and 3B are timing charts each showing part of the change in the air-fuel ratio of FIG. 2.
Figure 3B:
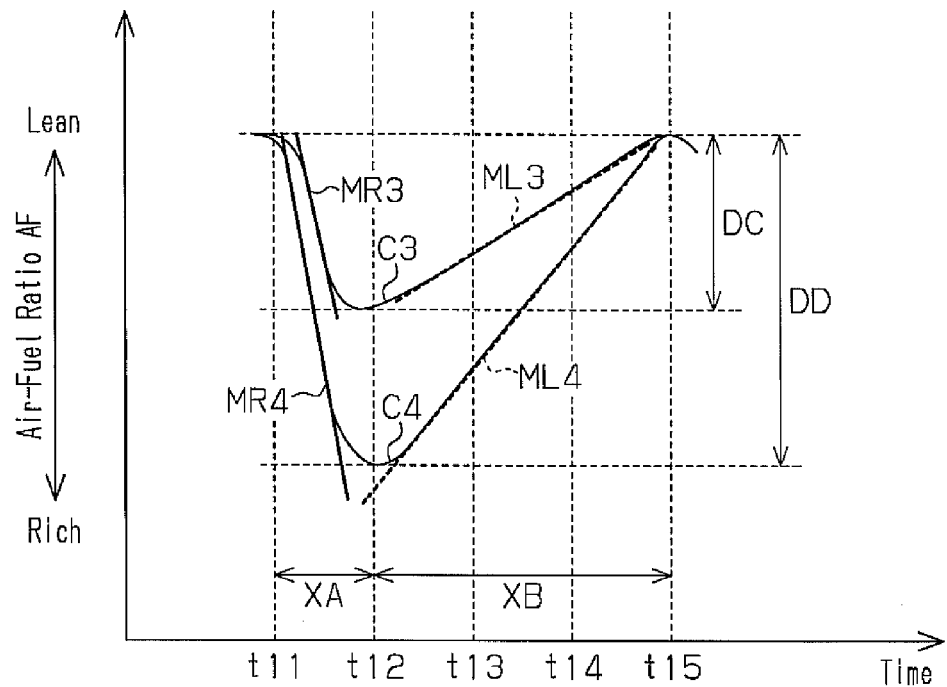

Referring to FIGS. 3A and 3B, the relationship of a variation rate IR, rich variation rate R, and lean variation rate L will be described. FIGS. 3A and 3B show changes in air-fuel ratio AF that are similar to those from time t11 to time 15 shown by items (b) and (c) in FIG. 2.

As shown by line segment C1 in FIG. 3A, when lean variation occurs such that the variation rate IR is relatively small (hereinafter referred to as a small lean-variation period), the difference DA between the peak values at the lean and rich sides of the air-fuel ratio AF decreases. Thus, the absolute values of the lean change rate L and rich change rate R are both small in the small lean-variation period. The lean change rate L in this state is approximate to the value obtained by dividing the difference DA by the period XA. Further, the rich change rate R in this state is approximate to the value obtained by dividing the difference DA by the period XB.

As shown by line segment C2 in FIG. 3A, when lean variation occurs such that the variation rate IR is greater than that of the small lean-variation period of line segment C1 (hereinafter referred to as a large lean-variation period), the difference DB between the peak values at the lean and rich sides of the air-fuel ratio AF becomes greater than the difference DA. Thus, the absolute values of the lean change rate L and rich change rate R in the large lean-variation period are both greater than those of the small lean-variation period. The lean change rate L in this state is approximate to the value obtained by dividing the difference DB by the period XA. Further, the rich change rate R in this state is approximate to the value obtained by dividing the difference DB by the period XB.

As shown by line segment C3 in FIG. 3B, when lean variation occurs such that the variation rate IR is relatively small (hereinafter referred to as a small rich-variation period), the difference DC between the peak values at the lean and rich sides of the air-fuel ratio AF decreases. Thus, the absolute values of the rich change rate R and lean change rate L are both small in the small rich-variation period. The rich change rate R in this state is approximate to the value obtained by dividing the difference DC by the period XA. Further, the lean change rate L in this state is approximate to the value obtained by dividing the difference DC by the period XB.

As indicated by line segment C4 in FIG. 3B, when rich variation occurs such that the variation rate IR is greater than that in the small rich-variation period of line segment C3 (hereinafter referred to as a large rich-variation period), the difference DD between the peak values at the lean and rich sides of the air-fuel ratio AF becomes greater the difference DC. Thus, the absolute values of the rich change rate R and lean change rate L in the large rich-variation period are greater than those in the small rich-variation period. The rich change rate R in this case is approximate to the value obtained by dividing the difference DD by the period XA. Further, the lean change rate L in this case is approximately equal to the value obtained by dividing the difference DD by the period XB.

As described above, the lean change rate L and rich change rate R of the air-fuel ratio AF reflect the variation between cylinders. Thus, the variation rate IR can be determined based on the lean change rate L and rich change rate R.

When there is a variation between the cylinders, the air-fuel ratio control maintains the average value of the air-fuel ratios AF at the target air-fuel ratio AFX. However, each air-fuel ratio AF greatly changes between the rich and lean sides. Unless the fuel injection amount QF for a specific cylinder, which causes a variation between cylinders, is appropriately corrected, the air-fuel ratio AF repetitively continues to change greatly.

Accordingly, the electronic control unit 41 executes variation determination control in order to determine the variation rate IR. The variation determination control includes a variation rate determination process, which determines the variation rate IR, and a variation cylinder determination process, which determines the specific cylinder causing variation between the cylinders.

With reference to FIGS. 3A and 3B, the calculation of the rich change rate R and lean change rate L will now be described.

The rich change rate R is calculated in the manner described below. Specifically, during the period XA in which the air-fuel ratio AF is changing from the peak value at the lean side toward the peak value at the rich side, the differential value of a function based on the air-fuel ratio AF is calculated for each crank angle, and the rich change rate R is calculated as the average value of the calculated differential values. The rich change rate R is calculated as a negative value and indicates a variation amount in the air-fuel ratio AF per unit time when the air-fuel ratio AF is changing during the period XA.

The lean change rate L is calculated in the manner described below. Specifically, during the period XB in which the air-fuel ratio AF is changing from the peak value at the rich side toward the peak value at the lean side, the differential value of a function based on the air-fuel ratio AF is calculated for each crank angle, and the lean change rate L is calculated as the average value of the calculated differential values. The lean change rate L is calculated as a positive value and indicates a variation amount in the air-fuel ratio AF per unit time when the air-fuel ratio AF is changing during the period XB.

As shown in FIG. 3A, the absolute value of the lean change rate L (the gradient of line segment ML1) is greater than the absolute value of the rich change rate R (the gradient of line segment MR1) in the small lean-variation period indicated by line segment C1. In addition, the absolute value of the lean change rate L (the gradient of line segment ML2) is greater than the absolute value of the rich change rate R (the gradient of line segment MR2) in the large lean-variation period of line segment C2. That is, when lean variation is occurring, the relationship of "absolute value of lean change rate L>absolute value of rich change rate R" is maintained regardless of changes in the degree of variation between the cylinders.

As shown in FIG. 3B, the absolute value of the rich change rate R (the gradient of line segment MR3) is greater than the absolute value of the lean change rate L (the gradient of line segment ML3) in the small rich-variation period of line segment C3. In addition, the absolute value of the rich change rate R (the gradient of line segment MR4) is greater than the absolute value of the lean change rate L (the gradient of line segment ML4) in the large rich-variation period of line segment C4. That is, when rich variation is occurring, the relationship of "absolute value of rich change rate R>absolute value of lean change rate L" is maintained regardless of changes in the degree of variation between the cylinders.

The contents of the variation rate determination process will now be described with reference to FIG. 4. The electronic control unit 41 repeats this process in predetermined computation cycles when the internal combustion engine 1 is running.

The electronic control unit 41 performs the variation rate determination process as described below.

In step S11, the electronic control unit 41 calculates a rich change rate R and a lean change rate L. The calculated rich and lean change rates R and L are stored in a memory. The calculation of the rich and lean change rates R and L is repeated in intervals corresponding to a single combustion cycle until the amount of data of the rich change rate R and lean change rate L stored in the memory becomes greater than or equal to a predetermined amount.

In step S12, if a determination is made that the amount of data for the rich change rate R and the amount of data for the lean change rate L stored in the memory is greater than or equal to the predetermined amount, the control unit 41 calculates the average value of the predetermined number of the rich change rates R (hereinafter referred to as "average rich change rate RA") in step S13. In addition, the control unit 41 calculates the average value of a predetermined number of lean change rates L (hereinafter referred to as the average lean change rate LA). The control unit 41 also calculates the sum of the average rich change rate RA and the average lean change rate LA (hereinafter referred to as change rate sum S). Further, the control unit 41 calculates the absolute value of the quotient that is the ratio of the average rich change rate RA to the average lean change rate LA (hereinafter referred to as the change rate quotient T).

In step S14, the electronic control unit 41 determines, based on the comparison between the change rate quotient T and a predetermined value TX, whether the variation between the cylinders is rich or lean variation. If rich variation is occurring, the change rate quotient T is greater than or equal to the predetermined value TX. If lean variation is occurring, the change rate quotient T is less than the predetermined value TX.

Figure 5A:
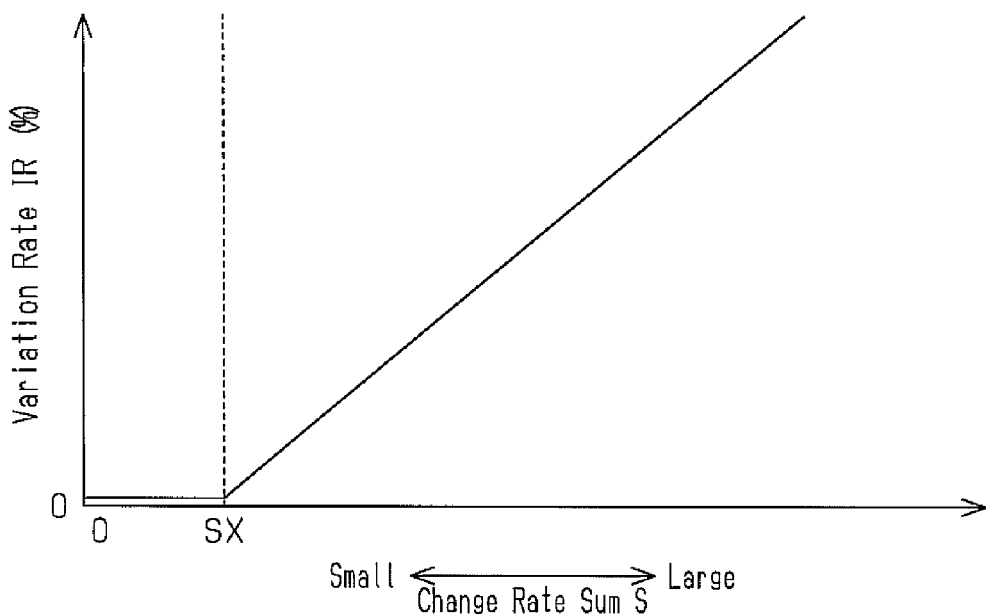
FIG. 5A is a map showing the relationship between the change rate sum and a variation rate that is used by the electronic controller of FIG. 1 when rich variation occurs.

When determined in step S14 that the absolute value of the change rate quotient T is greater than or equal to the predetermined value TX, a variation rate IR is calculated in step S15 by using a rich-variation period map shown in FIG. 5A and the change rate sum S calculated in step S13.

Figure 5B:
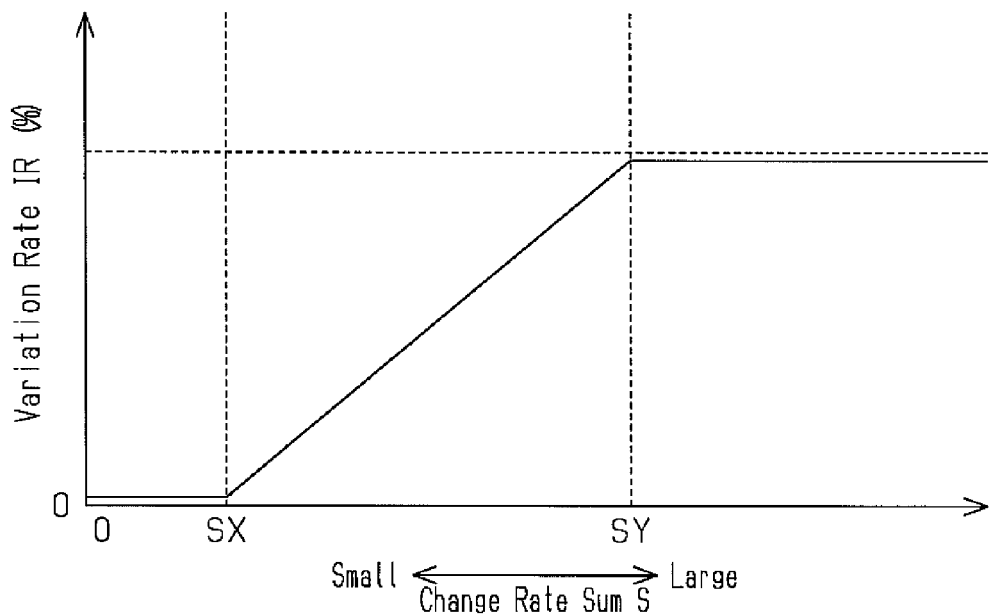
FIG. 5B is a map showing the relationship between the change rate sum and a variation rate that is used by the electronic controller of FIG. 1 when lean variation occurs.

When determined in step S14 that the absolute value of the change rate quotient T is less than the predetermined value TX, a variation rate IR is calculated in step S16 by using a lean-variation period map shown in FIG. 5B and the change rate sum S calculated in step S13.

The predetermined value TX is set as a value equal to "1," a value greater than "1" but approximate to "1," or a value smaller than "1" but approximate to "1.". In this embodiment, "1.2," which is greater than but approximate to "1" is set as the predetermined value TX.

If the calculated result of the change rate quotient T is approximate to "1" when "1" is set as the predetermined value TX, it may be determined that rich variation is occurring although lean variation is actually occurring. In such a case, when the fuel injection amount QF is corrected based on the determination of the occurrence of rich variation, the air-fuel ratio AF will be altered toward the lean side. This may result in misfiring. Thus, in order to avoid such determination of rich variation occurrence when the calculated result of the change rate quotient T is approximate to "1," a value greater than "1" is set as the predetermined value TX.

The contents of the map used during rich variation will now be described with reference to FIG. 5A. In this map, the relationship between the variation rate IR and the change rate sum S is preset as described below.

The variation rate IR is set to "0%" when the change rate sum S is in the range between "0" and a sum determination value SX. When the change rate sum S is greater than or equal to the sum determination value SX, the variation rate IR increases as the change rate sum S increases.

The contents of the map used in lean variation will now be described with reference to FIG. 5B. In this map, the relationship between the variation rate IR and the change rate sum S is preset as described below.

The variation rate IR is set to "0%" when the change rate sum S is in the range between "0" and a sum determination value SX. When the change rate sum S is in the range of greater than or equal to the sum determination value SX and less than or equal to a misfire determination value SY, the variation rate IR increases as the change rate sum S increases. When the change rate sum S is greater than the misfire determination value SY, the relationship between the change rate sum S and the variation rate IR is set such that the variation degree in the variation rate IR (hereinafter referred to as "variation change degree") relative to the change rate sum S is less than when the change rate sum S is greater than or equal to the sum determination value SX and less than or equal to the misfire determination value SY. Here, when the change rate sum S is greater than the misfire determination value SY, the variation rate IR is set as a fixed value regardless of the change rate sum S.

When lean variation is occurring but misfire is not occurring, the possibility is low of the air-fuel ratio AF being greater than a misfire air-fuel ratio AFY, which corresponds to the misfire determination value SY. That is, when the air-fuel ratio AF is greater than the misfire air-fuel ratio AFY, it is assumed that misfiring has occurred as a result of lean variation.

The air-fuel ratio AF in this state reflects the amount by which the air-fuel ratio deviates to the lean side from the air-fuel ratios AF of the other cylinders due to lean variation and the amount by which the air-fuel ratio deviates to the lean side from the air-fuel ratios AF of the other cylinders due to misfiring. Thus, to calculate the variation rate IR corresponding to the present lean variation, the effects of misfiring have to be eliminated or minimized.

Accordingly, in the lean-variation period map, the variation change degree in the range in which the change rate sum S is greater than the misfire determination value SY is set to be smaller than that in the range in which the change rate sum S is less than or equal to the misfire determination value SY.

The first embodiment has the advantages described below.

(1) In the first embodiment, a variation rate IR is determined based on a rich change rate R and lean change rate L that change in accordance with the variation rate IR. Thus, it is possible to decrease frequency for obtaining inaccurate determination results of variation between cylinders than when variation between cylinders is determined from the variation amount in the air-fuel ratio AF. That is, the determination of variation between cylinders is more accurate.

(2) In the first embodiment, a variation rate IR is determined based on a change rate sum S that changes according to the variation rate IR. Thus, the determination of variation between cylinders is more accurate.

The rich and lean change rates R and L have a relationship in which they have opposite signs. The absolute values of the rich change rate R and lean change rate L increase as the degree of variation between cylinders increases. In order to accurately obtain the degree of variation between cylinders, it is preferable that the sum of the rich and lean change rates R and L be obtained with the sign of one of the change rates set to be the same as the sign of the other one of the change rates. Such calculations may be performed by obtaining the sum of the absolute value of the negative change rate and positive change rate, obtaining the sum of the negative sign value of a positive change rate and negative change rate, and obtaining the sum of the absolute values of the rich and lean change rates R and L.

(3) In the first embodiment, the determination of whether variation between the cylinders is rich or lean is based on a rich change rate R and a lean change rate L, of which the relationship changes in accordance with whether the variation between cylinders is lean or rich. Thus, the determination of variation between cylinders is more accurate compared to when variation between cylinders is determined from the variation amount in air-fuel ratio AF.

(4) The absolute value of the lean change rate L differs from that of the rich change rate R. When lean variation occurs, the absolute value of the lean change rate L is greater than that of the rich change rate R. When rich variation occurs, the absolute value of the rich change rate R is greater than that of the lean change rate L. In other words, the ratio of the lean change rate L to the rich change rate R reflects a rich or leans variation between cylinders.

In the present embodiment, determination of whether variation between the cylinders is rich or lean is determined based on the ratio of the rich change rate R to the lean change rate L, which changes in accordance with whether the variation between cylinders is rich or lean. Thus, the determination of variation between cylinders is more accurate.

(5) When the air-fuel ratio of a specific cylinder greatly deviates to the lean side, misfiring is likely to occur. When exhaust including a high proportion of the exhaust from the specific cylinder in which misfiring occurred passes through the junction 33 of the exhaust manifold 31, the air-fuel ratio AF has a leaner value than the lean value obtained when a variation occurs between cylinders. That is, when lean variation is occurring and the air-fuel ratio AF is greatly deviated to the lean side, variation between cylinders and misfiring may be reflected on the air-fuel ratio AF. Thus, to obtain the proper variation rate IR, it is preferable that the effects of misfiring be minimized, that is, that the degree of changes in the variation be minimized.

In the present embodiment, when variation between cylinders is lean and the change rate sum S is greater than the misfire determination value SY, a variation rate IR is calculated so that the variation change degree is less than when the variation between cylinders is lean and the absolute value of the change rate sum S is less than or equal to the misfire determination value SY. Thus, the actual variation rate IR and calculated variation rate IR are prevented from excessively deviating from each other due to the occurrence of misfiring.

(6) Item (d) in FIG. 2 shows an example of changes in the air-fuel ratio AF when unstable combustion occurs in a state in which rich variation occurring when the air-fuel ratio AF of cylinder #1 is greatly deviating to the rich side from the air-fuel ratios AF of the cylinders #2 to #4 and the air-fuel ratio AF is changing from the peak value at the lean side toward the peak value at the rich side. In FIG. 2, item (d) shows the same change as that in item (c) except in that combustion is unstable.

When unstable combustion occurs during the period from time t11 to time t12, that is, during the period in which the air-fuel ratio AF changes from the peak value at the lean side toward the peak value at the rich side, the air-fuel ratio AF changes differently from when the combustion is stable (i.e., in the item (c) in FIG. 2).

When determining the degree of variation between cylinders based on information of the air-fuel ratio AF (e.g., two peak values) obtained during the period from time t11 to time t12, the determination is based on information greatly affected by factors other than variation between cylinders. Thus, the determination of variation between cylinders may not be accurate.

However, in the present embodiment, variation between cylinders is determined based on the rich change rate R, that is, the information of the air-fuel ratio AF obtained during the period from time t11 to time t12, and the lean change rate L, that is, the information of the air fuel ratio AF obtained during the period from time t12 to time t15. In other words, the determination is performed based on the rich change rate R for when combustion is unstable and the lean change rate L for when combustion is stable. This decreases the effect of unstable combustion more than in the above determination. Thus, the determination of variation between cylinders is more accurate.

(7) In FIG. 2, item (e) shows an example of changes in the air-fuel ratio AF when the target air-fuel ratio AFX is altered to the rich side in a state in which no variation is occurring between cylinders.

At time t13, that is, when the target air-fuel ratio AFX is altered to the target air-fuel ratio at the rich side, the air-fuel ratio AF changes from the lean side toward the rich side. Then, the air-fuel ratio AF is maintained near the new target air-fuel ratio.

When determining the degree of variation between cylinders based on the information of the air-fuel ratio AF (e.g., two peak values) obtained during the period in which the air-fuel ratio AF changes as the target air-fuel ratio changes, a change in the air-fuel ratio AF may be determined as being caused from a variation between cylinders. Specifically, when the variation amount in the air-fuel ratio AF, which is calculated from the two peak values, is greater than the determination value used for determining variation between cylinders, it is determined that variation is occurring between cylinders since the variation amount of the air fuel ratio AF is large even though a variation is actually not occurring between the cylinders.

However, in the present embodiment, variation between cylinders is determined based on a rich change rate R and a lean change rate L. Specifically, in addition to the variation in the air-fuel ratio AF from the lean side to the rich side, the variation amount in the air-fuel ratio AF from the rich side to the lean side is determined. Thus, the accuracy of the determination of variation between cylinders decreases. In other words, even when the air-fuel ratio AF changes from the lean side to the rich side due to a change in the target air-fuel ratio AFX when a variation is occurring between cylinders as described above, the air-fuel ratio AF does not change from the rich side to the lean side afterward. Thus, an erroneous determination is not obtained as in the determination performed as described above.

(8) In the first embodiment, variation between cylinders is determined based on a plurality of rich change rates R (the average rich change rate RA) and a plurality of lean change rates L (the average lean change rate LA). Thus, the determination of variation between cylinders is more accurate than a structure in which variation between cylinders is determined based on the sum of a single rich change rate R and a single lean change rate L.

Second Embodiment

A second embodiment of the present invention will now be described with reference to FIG. 6.

In the first embodiment, the variation rate IR of variation between cylinders is calculated by performing the variation rate determination process during variation determination control. In the second embodiment, instead of the variation rate determination process, a variation occurrence determination process that determines whether variation between cylinders is occurring is performed. The differences from the first embodiment will now be described in detail. Like or same reference numerals are given to those components that are the same as the corresponding components of the first embodiment. Such components will not be described.

Referring to FIG. 6, the contents of variation occurrence determination process will now be described. This process is repeated by the electronic control unit 41 in predetermined calculation cycles when the internal combustion engine is running.

The electronic control unit 41 performs the variation occurrence determination process as described below.

In step S21, the electronic control unit 41 calculates a rich change rate R and a lean change rate L. The calculated rich and lean change rates R and L are stored in a memory. The calculation of the rich and lean change rates R and L is repeated in intervals corresponding to a single combustion cycle until the amount of data of the rich change rate R and the lean change rate L stored in the memory reaches a predetermined amount.

In step S22, when determined that the amount of data of the rich change rate R and the lean change rate L stored in the memory is greater than or equal to the predetermined amount, the control unit 41 calculates the average rich change rate RA in step S23, which is the average value of the predetermined number of the rich change rates R. Further, the control unit 41 calculates the average lean change rate LA, which is the average value of the predetermined number of lean change rates L. The control unit 41 also calculates the change rate sum S, which is the sum of the average rich change rate RA and the average lean change rate LA.

In step 24, based on a comparison between the change rate sum S and a sum determination value SX, the electronic control unit 41 determines whether variation is occurring between cylinders. When variation is occurring between cylinders, the change rate sum S is greater than or equal to the sum determination value SX. On the other hand, when variation is not occurring between cylinders, the change rate sum S is less than the sum determination value SX.

When determining in step S24 that the change rate sum S is greater than or equal to the sum determination value SX, in step S25, the control unit 41 determines that variation is occurring between cylinders and sets a variation occurrence flag to ON.

When determining in step S24 that the change rate sum S is less than the sum determination value SX, in step S26, the control unit 41 determines that variation is not occurring between cylinders and sets the occurrence flag to OFF.

In addition to the advantage (1) of the first embodiment, which is in that the determination of variation between cylinders is more accurate, and advantage (8) of the first embodiment, the second embodiment has the advantages described below.

(9) In the present embodiment, the occurrence of a variation between cylinders is determined based on the rich change rate R and the lean change rate L, which change in accordance with the variation rate IR. Thus, the determination of variation between cylinders is more accurate than when variation between cylinders is determined based on the variation amount in air-fuel ratio AF.

(10) In the present embodiment, the average rich change rate RA and the average lean change rate LA are calculated, and the occurrence of variation between cylinders is determined based on whether the change rate sum S is greater than the sum determination value SX. In this manner, the occurrence of a variation between cylinders is determined based on the change rate sum S that changes in accordance with the variation rate IR. Thus, the determination of variation between cylinders is more accurate.

Other Embodiments

It should be apparent to those skilled in the art that the present invention may be embodied in many other specific forms without departing from the spirit or scope of the invention. Particularly, it should be understood that the present invention may be embodied in the following forms.

In the first embodiment, the variation rate IR is calculated based on the change rate sum S, which serves as a change rate computation value. However, this may be replaced by any one of (A1) to (A3) described below.

(A1) The variation rate IR is calculated based on the product of the average rich change rate RA and the average lean change rate LA.

(A2) The variation rate IR is calculated based on the difference between the absolute values of the average rich and lean change rates RA and LA, the difference between the absolute value of the average rich change rate RA and the average lean change rate LA, or the difference between the average rich change rate RA and the value obtained by inverting the average lean change rate LA to a negative sign.

(A3) The variation rate IR is calculated based on the ratio of the average lean change rate LA to the average rich change rate RA or the ratio of the average rich change rate RA to the average lean change rate LA.

In the first embodiment, the absolute value of the ratio of the average rich change rate RA to the average lean change rate LA is calculated as a change rate quotient T. However, this may be replaced by any one of (B1) to (B3) described below.

(B1) The absolute value of the ratio of the average lean change rate LA to the average rich change rate RA is calculated as a change rate quotient T.

(B2) The ratio of the average rich change rate RA to the average lean change rate LA is calculated as a change rate quotient T.

(B3) The ratio of the average lean change rate LA to the change rate of the average rich change rate RA with an inverted sign is calculated as a change rate quotient T.

(B4) The ratio of the average rich change rate RA to the average lean change rate LA with an inverted sign is calculated as a change rate quotient T.

Figure 4:
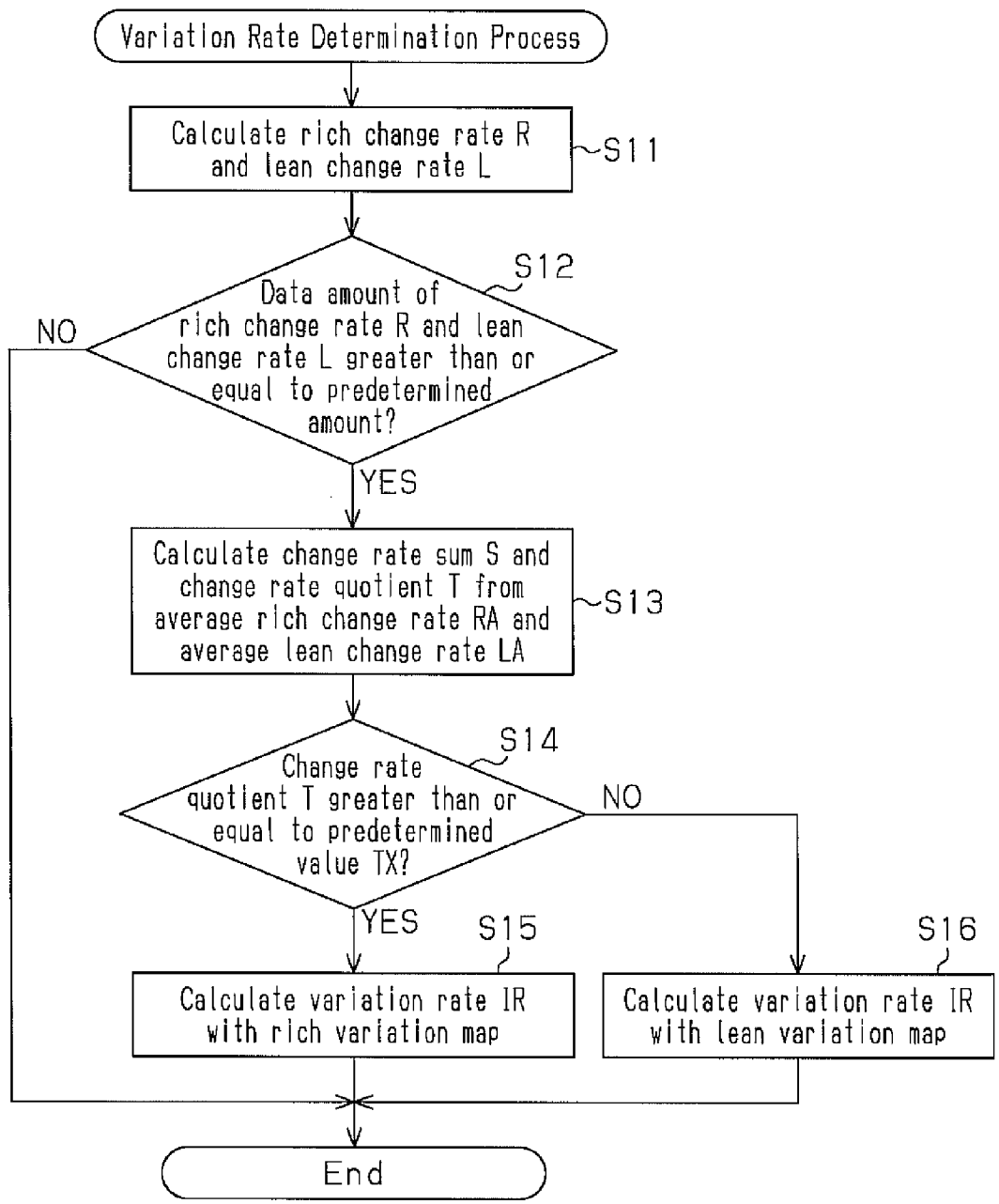
FIG. 4 is a flowchart showing the procedures for a variation rate determination process performed by an electronic controller of FIG. 1.

In the first embodiment, the determination of whether a variation between cylinders is lean or rich is based on a change rate quotient T in the variation rate determination process shown in FIG. 4. However, the determination of whether a variation between cylinders is lean or rich may be based on the difference between the absolute values of the average rich and lean change rates RA and LA, the difference between the absolute value of the average rich change rate RA and the average lean change rate LA, or the difference between the average rich change rate RA and the value obtained by inverting the average lean change rate LA to a negative sign.

The first embodiment performs the process for determining the variation rate IR based on the change rate sum S and the process for determining whether variation between cylinders is rich or lean based on a change rate quotient T. However, the first embodiment may perform only the former process or only the latter process.

In the first embodiment, a rich-variation period map and a lean-variation period map are prepared in advance as maps for calculating a variation rate IR. However, these maps may be formed as described below in (C1) or (C2).

(C1) Two maps are prepared in advance. One map is used when lean variation is occurring and the change rate sum S is greater than the misfire determination value SY. The other map is used when lean variation is occurring and, at the same time, the change rate sum S is less than or equal to the misfire determination value SY, and when rich variation is occurring.

(C2) A single map is prepared in advance and used when lean variation occurs and when rich variation occurs.

In the second embodiment, the determination of whether a variation is occurring between cylinders is based on a change rate sum S in the variation rate determination process. However, this may be determined by any one of (D1) to (D4) described below.

(D1) The product of the average rich change rate RA and average lean change rate LA is calculated, and the determination of whether a variation is occurring between cylinders is based on whether the absolute value of the product is greater than or equal to a product determination value.

(D2) The difference between the absolute values of the average rich and lean change rates RA and LA is calculated, and the determination of whether variation is occurring between cylinders is determined based on whether the difference is greater than or equal to a difference determination value.

(D3) The difference between the average rich change rate RA and the average lean change rate LA, one of which has an inverted sign, is calculated, and the determination of whether a variation is occurring between cylinders is based on whether the difference is greater than or equal to a difference determination value.

(D4) The determination of whether variation is occurring between cylinders is based on the ratio of the average lean change rate LA to the average rich change rate RA or the ratio of the average rich change rate RA to the average lean change rate LA.

In the second embodiment, when the change rate sum S is greater than the sum determination value SX, it is determined that a variation is occurring between cylinders. However, the determination of whether a variation is occurring between cylinders may be performed as described below. When the larger one of the absolute values of the average rich change rate RA and the average lean change value LA is greater than or equal to a first determination value, and the smaller one of the absolute values is greater than or equal to a second determination value (<the first determination value) but less than the first determination value, it may be determined that a variation is occurring between cylinders.

In each of the above embodiments, the sum of the absolute value of the average rich change rate RA (negative change rate) and the absolute value of the average lean change value LA (positive change rate) is calculated as a change rate sum S. However, this may be replaced by (E1) or (E2). The signs of the rich change rate R and lean change rate L are opposite to each other. Further, the absolute values of the rich change rate R and lean charge rate L increase as the degree of variation between the cylinders increases. To accurately obtain the degree of variation between cylinders, it is preferable that the sign of one of the change rates be the same as that of the other one before calculating the sum of the rich and lean change rates R and L.

(E1) The sum of the absolute value of the average rich change rate RA (negative change rate) and the average lean change rate LA (positive change rate) is calculated as the change rate sum S.

(E2) The sum of the average rich change rate RA (negative change rate) and the value obtained by inverting the mathematical sign of the average lean change rate LA (positive change rate) is calculated as the change rate sum S.

In each of the above embodiments, the average value of a plurality of differential values in the period of time that an air-fuel ratio AF changes from the peak value on the lean side toward the peak value on the rich side is calculated as a rich change rate R. However, the rich change rate R may be calculated based on a plurality of differential values other than those approximately equal to the peak value on the lean side.

In each of the above embodiments, the average value of a plurality of differential values in the period in which the air-fuel ratio AF changes from the peak value at the rich side toward the peak value at the lean side is calculated as a lean change rate L. However, the lean change rate L may be calculated based on a plurality of differential values other than those approximate to the peak value at the rich side.

In each of the above embodiments, the average value of a plurality of differential values in the period in which air-fuel ratio AF changes from the peak value at the lean side toward the peak value at the rich side is calculated as the rich change rate R. However, the rich change rate R may be calculated as described below. That is, a single differential value in the period in which the air-fuel ratio AF changes from the peak value at the lean side toward the peak value at the rich side may be calculated as the rich change rate R.

In each of the above embodiments, the average value of a plurality of differential values in the period in which the air-fuel ratio AF changes from the peak value at the rich side toward the peak value at the lean side is calculated as the lean change rate L. However, the lean change rate L may be calculated as described below. That is, a single differential value in the period in which the air-fuel ratio AF changes from the peak value at the rich side toward the peak value at the lean side may be calculated as the lean change rate L.

In each of the above embodiments, the average value of a plurality of differential values in the period in which the air-fuel ratio AF changes from the peak value at the lean side toward the peak value at the rich side is calculated as the rich change rate R. However, the rich change rate R may be calculated as described below. That is, the variation amount in the air-fuel ratio AF when the air-fuel ratio AF changes from the peak value at the lean side toward the peak value at the rich side, namely, the difference between the peak values at the lean and rich sides of the air-fuel ratio AF, is calculated. Then, the difference is divided by the period from when the air-fuel ratio AF reaches the former peak value to when the air-fuel ratio AF reaches the latter peak value to calculate the rich change rate R.

In each of the above embodiments, the average value of a plurality of differential values in the period in which the air-fuel ratio AF changes from the peak value at the rich side toward the peak value at the lean side is calculated as the lean change rate L. However, the lean change rate L may be calculating as described below. That is, the variation amount in the air-fuel ratio AF when the air-fuel ratio AF changes from the peak value at the rich side toward the peak value at the lean side, namely, the difference between the peak values at the lean and rich sides of the air-fuel ratio AF, is calculated. Then, the difference is divided by the period from when the air-fuel ratio AF reaches the former peak value to when the air-fuel ratio AF reaches the latter peak value to calculate the lean change rate L.

In each of the above embodiments, the change rate sum S and the change rate quotient T are calculated based on the average rich change rate RA and the average lean change rate LA. However, the change rate sum S and the change rate quotient T may be calculated based on a single rich change rate R and a single lean change rate L.

In each of the above embodiments, the change rate sum S and the change rate quotient T are calculated based on the average rich change rate RA and the average lean change rate LA. However, the change rate sum S and the change rate quotient T may be calculating as described below. That is, the change rate sum S or change rate quotient T is calculated based on a single rich change rate R and a single lean change rate L, the calculation is repeated to obtain a plurality of change rate sums S or a plurality of change rate quotients T, and the average value of the change rate sums S or the average value of the change rate quotients T is calculated as the change rate sum S or the change rate quotient T.

In each of the above embodiments, the sum of the absolute value of the average rich change rate RA and the absolute value of the average lean change rate LA is calculated as a change rate sum S. However, the change rate sum S may be calculated using a computation value other than the rich change rate R and lean change rate L. For example, the absolute value of the sum of the rich change rates R and the absolute value of the sum of the lean change rates L can be calculated as the change rate sum S.

In each of the above embodiments, the ratio of the average lean change rate LA to the average rich change rate RA is calculated as the change rate quotient T. However, the change rate quotient may be calculated using a computation value other than the average of the rich change rate R and lean change rate L. For example, the absolute value of the ratio of the lean change rates L to the sum of the rich change rates R may be calculated as a change rate quotient.

In each of the above embodiments, the sum of the absolute value of the average rich change rate RA and the absolute value of the average lean change rate LA is calculated as the change rate sum S. However, the sum of the product of the absolute value of the average rich change rate RA and a first constant and the product of the absolute value of the average lean change rate LA and a second constant may be calculated as the change rate sum S. Here, by using different first and second constants, a change rate sum S weighed to either the rich change rate R or lean change rate L can be calculated.

In each of the above embodiments, the variation rate determination process and the variation occurrence determination process are performed using the sum of the absolute values of the average rich change rates RA and the sum of the absolute values of the average lean change rates LA. However, the change rate sum may be calculated using a value obtained by performing a predetermined computation on either the average rich change rate RA or the average lean change rate LA. In this case, the sum of the one of the change rates that has undergone the computation process and the other one of the change rates is calculated. Alternatively, the sum of values obtained by performing the computation process on both change rates is calculated.

For example, either one of the average rich change rate RA or average lean change rate LA is squared. Then, the sum of the squared value and the other change rate is used as the change rate sum S. Alternatively, a constant may be added to either one of the average rich change RA and the average lean change rate LA, and then the sum of the obtained value and the other change rate may be used as the change rate sum S. In the same manner, a change rate quotient T may be calculated by manipulating at least one of the average rich change rate RA and the average lean change rate LA.

In each of the above embodiments, the present invention is applied to an air-fuel ratio diagnostic device for an in-line four-cylinder spark ignition internal combustion engine. However, the air-fuel ratio diagnostic device according to the present invention is not limited to such an application. For example, the present invention may be applied to an air-fuel ratio diagnostic device for a spark ignition internal combustion engine of an in-line type with six or eight cylinders. That is, the present invention may be applied to an air-fuel ratio diagnostic device for any internal combustion engine as long as the air-fuel ratio diagnostic device includes an air-fuel ratio sensor, which detects oxygen concentration in exhaust at the junction of an exhaust manifold where exhaust from a plurality of cylinders meet, and determines variation between cylinders based on the value detected by the air-fuel ratio sensor. In such a case, the same advantages as the above embodiments are obtained.

The present examples and embodiments are to be considered as illustrative and not restrictive, and the invention is not to be limited to the details given herein, but may be modified within the scope and equivalence of the appended claims.

The invention claimed is:

1. An air-fuel ratio diagnostic device for an internal combustion engine that includes an exhaust manifold provided with a junction in which exhaust discharged from a plurality of cylinders meet, the device comprising:
an air-fuel ratio sensor that detects oxygen concentration in the exhaust at the junction; and
a determination unit that performs a determination related with a variation between the cylinders, which includes a variation in an air-fuel ratio between the cylinders, based on a detection value of the air-fuel ratio sensor, wherein
a change amount in the detection value for a certain time when the detection value is changing from a peak value at the lean side toward a peak value at the rich side is defined as a rich change rate,
a change amount in the detection value for a certain time when the detection value is changing from a peak value at the rich side toward a peak value at the lean side is defined as a lean change rate, and
the determination unit determines a degree of variation between the cylinders based on the rich change rate and the lean change rate.

2. The diagnostic device according to claim 1, wherein the determination unit determines the degree of variation between the cylinders based on a sum of the rich change rate and the lean change rate.

3. The diagnostic device according to claim 1, wherein the determination unit determines the degree of variation between the cylinders based on a product of the rich change rate and the lean change rate.

4. The diagnostic device according to claim 1, wherein the determination unit determines the degree of variation between the cylinders based on a difference between the rich change rate and the lean change rate.

5. The diagnostic device according to claim 1, wherein the determination unit determines whether the variation between the cylinders is a rich variation or a lean variation based on the rich change rate and the lean change rate.

6. The diagnostic device according to claim 5, wherein the determination unit determines whether the variation between the cylinders is the rich variation or the lean variation based on a ratio of the lean change rate to the rich change rate or a ratio of the rich change rate to the lean change rate.

7. The diagnostic device according to claim 6, wherein
the rich change rate and the lean change rate are used to calculate a change rate computation value,
a changing degree in the degree of variation between the cylinders relative to the change rate computation value is used as a variation change degree,
the determination unit calculates the degree of variation between the cylinders based on an absolute value of the change rate computation value, and
when the variation between the cylinders is the lean variation and the absolute value of the change rate computation value is greater than a reference value, the determination unit calculates the degree of variation between the cylinders so that the variation change degree is smaller than when the variation between the cylinders is the lean variation and the absolute value of the change rate computation value is less than or equal to the reference value.

8. The diagnostic device according to claim 5, wherein the determination unit determines whether the variation between the cylinders is the rich variation or the lean variation based on the difference between the rich change rate and the lean change rate.

9. The diagnostic device according to claim 8, wherein:
the rich change rate and the lean change rate are used to calculate a change rate computation value,
a changing degree in the degree of variation between the cylinders relative to the change rate computation value is used as a variation change degree;
the determination unit calculates the degree of variation between the cylinders based on an absolute value of an change rate computation value, and
when the variation between the cylinders is the lean variation and the absolute value of the change rate computation value is greater than a reference value, the determination unit calculates the degree of variation between the cylinders so that the variation change degree is smaller than when the variation between the cylinders is the lean variation and the absolute value of the change rate computation value is less than or equal to the reference value.

10. The diagnostic device according to claim 1, wherein the determination unit determines whether the variation between the cylinders is occurring based on the rich change rate and the lean change rate.

11. An air-fuel ratio diagnostic device for an internal combustion engine that includes an exhaust manifold provided with a junction in which exhaust discharged from a plurality of cylinders meet, the device comprising:
an air-fuel ratio sensor that detects oxygen concentration in the exhaust at the junction; and
a determination unit that performs a determination related with a variation between the cylinders, which includes a variation in an air-fuel ratio between the cylinders, based on a detection value of the air-fuel ratio sensor, wherein
a change amount in the detection value for a certain time when the detection value is changing from a peak value at the lean side toward a peak value at the rich side is defined as a rich change rate,
a change amount in the detection value for a certain time when the detection value is changing from a peak value at the rich side toward a peak value at the lean side is defined as a lean change rate, and
the determination unit determines whether the variation between the cylinders is a rich variation or a lean variation based on the rich change rate and the lean change rate.

12. The diagnostic device according to claim 11, wherein the determination unit determines whether the variation between the cylinders is the rich variation or the lean variation based on a ratio of the lean change rate to the rich change rate or a ratio of the rich change rate to the lean change rate.

13. The diagnostic device according to claim 11, wherein the determination unit determines whether variation between the cylinders is the rich variation or the lean variation based on a difference between the rich change rate and the lean change rate.

14. The diagnostic device according to claim 11, wherein the determination unit determines whether the variation between the cylinders is occurring based on the rich change rate and the lean change rate.

15. An air-fuel ratio diagnostic device for an internal combustion engine that includes an exhaust manifold provided with a junction in which exhaust discharged from a plurality of cylinders meet, the device comprising:
an air-fuel ratio sensor that detects oxygen concentration in the exhaust at the junction; and
a determination unit that performs a determination related with a variation between the cylinders, which includes a variation in an air-fuel ratio between the cylinders, based on a detection value of the air-fuel ratio sensor, wherein
a change amount in the detection value for a certain time when the detection value is changing from a peak value at the lean side toward a peak value at the rich side is defined as a rich change rate, a change amount in the detection value for a certain time when the detection value is changing from a peak value at the rich side toward a peak value at the lean side is defined as a lean change rate, and the determination unit calculates a plurality of the rich change rates and a plurality of the lean change rates to determine whether or not the variation between the cylinders is occurring based on whether a sum of the rich change rates and the lean change rates is greater than a sum determination value.

\* \* \* \* \*